(12) United States Patent
Kikuchi

(10) Patent No.: US 11,002,838 B2
(45) Date of Patent: May 11, 2021

(54) COMMUNICATION MANAGEMENT SYSTEM OF SURVEYING INSTRUMENT

(71) Applicant: TOPCON CORPORATION, Tokyo (JP)

(72) Inventor: Takeshi Kikuchi, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 374 days.

(21) Appl. No.: 15/992,929

(22) Filed: May 30, 2018

(65) Prior Publication Data

US 2019/0004157 A1    Jan. 3, 2019

(30) Foreign Application Priority Data

Jun. 28, 2017   (JP) .............................. JP2017-125784

(51) Int. Cl.
*G01S 7/00*       (2006.01)
*G01S 7/497*     (2006.01)
(Continued)

(52) U.S. Cl.
CPC ............ *G01S 7/497* (2013.01); *G01C 15/002* (2013.01); *G01S 7/003* (2013.01); *G01S 7/4808* (2013.01); *G01S 17/06* (2013.01); *G01S 17/88* (2013.01)

(58) Field of Classification Search
USPC ................................................ 356/4.01, 5.01
See application file for complete search history.

(56) References Cited

U.S. PATENT DOCUMENTS 5,742,378 A * 4/1998 Kumagai ............... G01C 15/06
33/293
6,204,498 B1 * 3/2001 Kumagai ................. G01C 9/06
250/222.1
(Continued)

FOREIGN PATENT DOCUMENTS

JP       2001202566 A  *  7/2001
JP       2002090144 A  *  3/2002
(Continued)

OTHER PUBLICATIONS

English Translation of JP-2001202566-A (Year: 2001).*
(Continued)

*Primary Examiner* — James R Hulka
(74) *Attorney, Agent, or Firm* — Roberts Calderon Safran & Cole P.C.

(57) ABSTRACT

An object is to provide a communication management system that prevents a surveying instrument from being used in an environment exceeding a guaranteed range of specifications. To achieve the above-described object, a communication management system includes a surveying instrument including a survey unit, a temperature sensor, a control unit, and a communication unit, a management server, and a remote terminal, wherein the remote terminal sets a usable temperature of the surveying instrument, sets a determination on the usable temperature and a temperature acquired by the temperature sensor, and an operation responsive to results of the determination, and makes the management server store these, the surveying instrument transmits its own temperature information to the management server, and the management server makes the determination by comparing the usable temperature and a temperature acquired by the temperature sensor, and executes the operation based on results of the determination.

5 Claims, 7 Drawing Sheets

(51) Int. Cl.
    *G01S 7/48*     (2006.01)
    *G01S 17/06*     (2006.01)
    *G01C 15/00*     (2006.01)
    *G01S 17/88*     (2006.01)

(56) References Cited

U.S. PATENT DOCUMENTS

| | | | | |
|---|---|---|---|---|
| 7,127,822 B2 * | 10/2006 | Kumagai | ............ | G01C 15/002 33/290 |
| 7,319,512 B2 * | 1/2008 | Ohtomo | ............ | G01C 15/002 356/4.01 |
| 7,433,028 B2 * | 10/2008 | Kumagai | ............ | G01C 15/004 356/139.03 |
| 7,564,488 B2 * | 7/2009 | Kumagai | ............ | G01C 15/002 348/207.99 |
| 7,701,566 B2 * | 4/2010 | Kumagai | ............ | G01S 17/66 356/141.5 |
| 7,861,423 B2 * | 1/2011 | Kumagai | ............ | G01S 7/4812 33/281 |
| 8,184,267 B2 * | 5/2012 | Kumagai | ............ | G01S 17/66 356/3.08 |
| 8,321,167 B2 * | 11/2012 | Haijima | ............ | G01C 15/002 702/94 |
| 8,643,828 B2 * | 2/2014 | Ohtomo | ............ | G01S 17/14 356/5.01 |
| 9,273,959 B2 * | 3/2016 | Kumagai | ............ | G01C 15/002 |
| 9,571,794 B2 * | 2/2017 | Kumagai | ............ | G01C 15/002 |
| 9,909,871 B2 * | 3/2018 | Kumagai | ............ | G01C 15/008 |
| 9,958,268 B2 * | 5/2018 | Ohtomo | ............ | G01S 17/66 |
| 10,281,580 B2 * | 5/2019 | Ohtomo | ............ | G01S 7/4814 |
| 10,371,801 B2 * | 8/2019 | Ohtomo | ............ | G01C 3/08 |
| 10,520,307 B2 * | 12/2019 | Ohtomo | ............ | G01C 5/00 |
| 10,699,544 B2 * | 6/2020 | Kikuchi | ............ | G08C 17/02 |
| 2002/0097400 A1 * | 7/2002 | Jung | ............ | G01J 3/0264 356/419 |
| 2005/0275824 A1 * | 12/2005 | Ohtomo | ............ | G01C 15/002 356/4.03 |
| 2005/0275829 A1 * | 12/2005 | Kumagai | ............ | G01C 15/002 356/139 |
| 2006/0016085 A1 * | 1/2006 | Imamura | ............ | G01C 15/00 33/290 |
| 2007/0103672 A1 * | 5/2007 | Kumagai | ............ | G01C 15/004 356/139.03 |
| 2007/0195313 A1 * | 8/2007 | Haijima | ............ | G01C 5/02 356/138 |
| 2009/0153667 A1 * | 6/2009 | Kumagai | ............ | G01C 15/002 348/169 |
| 2009/0171610 A1 * | 7/2009 | Haijima | ............ | G01C 15/002 702/95 |
| 2009/0171618 A1 * | 7/2009 | Kumagai | ............ | G01S 7/003 702/152 |
| 2012/0105824 A1 * | 5/2012 | Ohtomo | ............ | G01S 17/87 356/5.01 |
| 2012/0133918 A1 * | 5/2012 | Sakimura | ............ | G01C 15/002 356/4.01 |
| 2013/0152412 A1 * | 6/2013 | Kumagai | ............ | G01C 15/002 33/291 |
| 2013/0155225 A1 * | 6/2013 | Kumagai | ............ | G01C 15/002 348/137 |
| 2013/0262026 A1 * | 10/2013 | Momiyama | ............ | G01C 15/008 702/154 |
| 2013/0284909 A1 * | 10/2013 | Ohtomo | ............ | G01D 5/3473 250/231.14 |
| 2014/0207282 A1 * | 7/2014 | Angle | ............ | H04L 12/2809 700/257 |
| 2014/0259709 A1 * | 9/2014 | Kumagai | ............ | G01C 15/008 33/290 |
| 2015/0077545 A1 * | 3/2015 | Ohtomo | ............ | G01C 15/06 348/135 |
| 2015/0108338 A1 * | 4/2015 | Ohtomo | ............ | G01B 11/26 250/231.13 |
| 2015/0116693 A1 * | 4/2015 | Ohtomo | ............ | G01S 17/42 356/4.01 |
| 2015/0240988 A1 * | 8/2015 | White | ............ | E02F 9/261 248/552 |
| 2016/0167234 A1 * | 6/2016 | Angle | ............ | H04L 12/2809 701/2 |
| 2016/0252348 A1 * | 9/2016 | Momiyama | ............ | G01C 5/06 342/357.34 |
| 2016/0349051 A1 * | 12/2016 | Kumagai | ............ | G01S 17/42 |
| 2017/0059696 A1 * | 3/2017 | Ohtomo | ............ | G01C 3/08 |
| 2017/0059709 A1 * | 3/2017 | Ohtomo | ............ | G01C 15/008 |
| 2017/0131404 A1 * | 5/2017 | Ohtomo | ............ | G01C 15/002 |
| 2017/0167870 A1 * | 6/2017 | Nishita | ............ | G01C 11/04 |
| 2017/0168142 A1 * | 6/2017 | Kumagai | ............ | G01S 17/86 |
| 2017/0227357 A1 * | 8/2017 | Ohtomo | ............ | G01S 17/86 |
| 2019/0078883 A1 * | 3/2019 | Yuasa | ............ | G01S 7/4817 |
| 2019/0306244 A1 * | 10/2019 | Kikuchi | ............ | H04L 67/125 |
| 2020/0043310 A1 * | 2/2020 | Kikuchi | ............ | G08C 15/00 |
| 2020/0141730 A1 * | 5/2020 | Kikuchi | ............ | G01C 3/08 |
| 2020/0143647 A1 * | 5/2020 | Kikuchi | ............ | G08B 13/22 |
| 2020/0200564 A1 * | 6/2020 | Kikuchi | ............ | G01C 15/00 |

FOREIGN PATENT DOCUMENTS

| | | | | | |
|---|---|---|---|---|---|
| JP | 2002163110 | A | * | 6/2002 | |
| JP | 2002163387 | A | * | 6/2002 | |
| JP | 2004227249 | A | * | 8/2004 | |
| JP | 2006038581 | A | * | 2/2006 | ............ G01C 15/00 |
| JP | 2006198287 | A | * | 8/2006 | |
| JP | 2007170978 | A | * | 7/2007 | |
| JP | 2007170978 | A | | 7/2007 | |
| JP | 2009139386 | A | * | 6/2009 | |
| JP | 2011164789 | A | * | 8/2011 | |
| JP | 2012117874 | A | * | 6/2012 | ............ G01C 15/002 |
| JP | 2016223904 | A | * | 12/2016 | |

OTHER PUBLICATIONS

English Translation of JP-2002163387-A (Year: 2002).*
English Translation of JP-2002163110-A (Year: 2002).*
English Translation of JP-2002090144-A (Year: 2002).*
English Translation of JP-2004227249-A (Year: 2004).*
English Translation of JP-2006038581-A (Year: 2006).*
English Translation of JP-2006198287-A (Year: 2006).*
English Translation of JP-2007170978-A (Year: 2007).*
English Translation of JP-2009139386-A (Year: 2009).*
English Translation of JP-2011164789-A (Year: 2011).*
English Translation of JP-2012117874-A (Year: 2012).*
English Translation of JP-2016223904-A (Year: 2016).*

* cited by examiner

COMMUNICATION MANAGEMENT SYSTEM OF SURVEYING INSTRUMENT

TECHNICAL FIELD

The present invention relates to a communication management system to keep measurement accuracy of a surveying instrument.

BACKGROUND ART

A surveying instrument (total station) is a device that performs a survey by irradiating a distance-measuring light onto a target placed at a measurement point and receives reflected light of the distance-measuring light. Since a surveying instrument is a precision instrument, in order to keep specifications (measurement accuracy) of the surveying instrument, it is preferably used under a temperature not exceeding a guaranteed range of the specifications.

The system disclosed in Patent Literature 1 includes a temperature sensor in a surveying instrument, and this temperature sensor detects a substrate temperature and the substrate temperature is saved in a memory. This temperature information is transmitted on demand from a management company as history information concerning measurement errors through Internet communication.

CITATION LIST

Patent Literature

Patent Literature 1: Japanese Published Unexamined Patent Application No. 2007-170978

SUMMARY OF THE INVENTION

Technical Problem

As described above, there is a conventional system that includes a temperature sensor in a surveying instrument and enables temperature information of the surveying instrument to be known from a remote site, however, the temperature information was just used as a piece of information (reference information) for error analysis of the surveying instrument.

However, by considering the fact that measurement accuracy of a surveying instrument could not be kept when the surveying instrument was used in an environment exceeding a guaranteed range of specifications, the inventor considered that the temperature information should be used as information not only for error analysis but also for monitoring for specifications guarantee.

An object of the present invention is to provide a communication management system to prevent a surveying instrument from being used in an environment exceeding a guaranteed range of specifications and keep measurement accuracy of the surveying instrument.

Solution to Problem

In order to solve the above-described problem, a communication management system according to an aspect of the present invention includes a surveying instrument including a survey unit that surveys a target, a temperature sensor, a control unit that controls the survey unit, and a communication unit that enables communication between the control unit and a communication network, a management server capable of communicating with the surveying instrument via the communication network, and a remote terminal capable of communicating with the management server, wherein the remote terminal sets a usable temperature of the surveying instrument, sets a determination on the usable temperature and a temperature acquired by the temperature sensor, and an operation responsive to results of the determination, and makes the management server store the usable temperature, the determination, and the operation, the surveying instrument transmits its own temperature information to the management server, and the management server makes the determination by comparing the usable temperature and a temperature acquired by the temperature sensor, and executes the operation based on results of the determination.

A communication management system according to another aspect of the present invention includes a surveying instrument including a survey unit that surveys a target, a GPS device that measures coordinates, a system timer that acquires a current time, a control unit that controls the survey unit, the GPS device, and the system timer, and a communication unit that enables communication between the control unit and a communication network, a management server capable of communicating with the surveying instrument via the communication network, and a remote terminal capable of communicating with the management server, wherein the remote terminal sets usable conditions relating to a usable temperature of the surveying instrument and a position and time of the surveying instrument, sets a determination on a predicted temperature predicted from GPS information acquired by the GPS device and time information acquired by the system timer, and the usable conditions, and an operation responsive to results of the determination, and makes the management server store the usable conditions, the determination, and the operation, the surveying instrument transmits its own GPS information and time information to the management server, and the management server makes the determination by comparing the usable temperature and a predicted temperature predicted from the GPS information and the time information, and executes the operation based on results of the determination.

In the aspect described above, it is also preferable that when a temperature of the surveying instrument is outside the usable temperature in the determination, as the operation, the management server notifies an owner and/or an administrator of the surveying instrument, and/or issues a warning to the surveying instrument and/or stops the function of the surveying instrument.

In another aspect described above, it is also preferable that when a predicted temperature of the surveying instrument is outside the usable temperature in the determination, as the operation, the management server notifies an owner and/or an administrator of the surveying instrument, and/or issues a warning to the surveying instrument and/or stops the function of the surveying instrument.

In another aspect described above, it is also preferable that the surveying instrument also transmits its own altitude information as the GPS information to the management server, a condition on the altitude is added to the usable conditions, and the management server corrects the predicted temperature based on the altitude information, makes the determination by comparing a corrected temperature and the usable temperature, and executes the operation based on results of the determination.

Effect of the Invention

According to the communication management system of the present invention, a surveying instrument can be prevented from being used in an environment exceeding a guaranteed range of specifications.

DESCRIPTION OF EMBODIMENTS

Next, preferred embodiments of the present invention are described with reference to the drawings.

First Embodiment (Entire Configuration of System)

Figure 1:
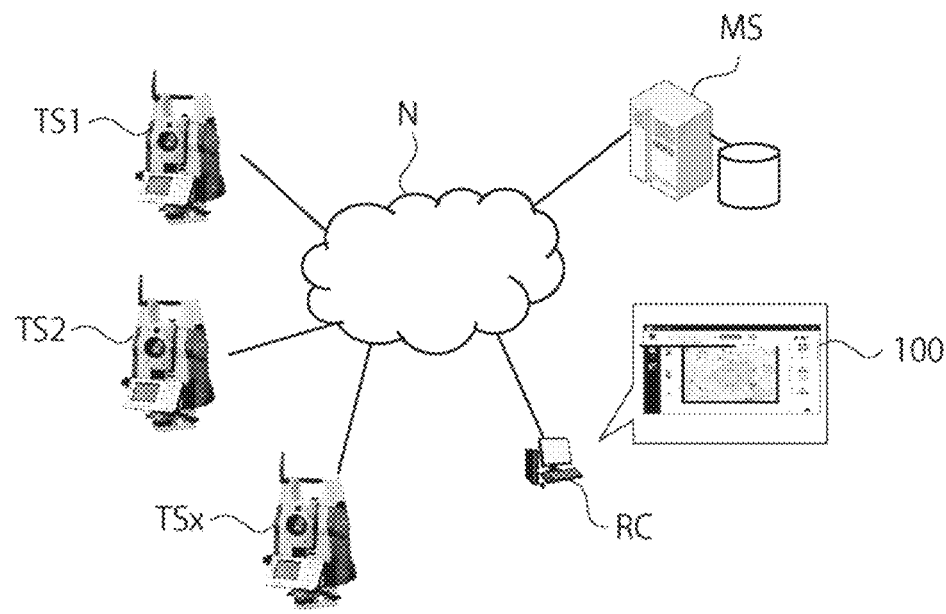
FIG. 1 is a view showing an entire configuration of a communication management system according to a first embodiment of the present invention.

FIG. 1 is a view showing an entire configuration of a communication management system (hereinafter, simply referred to as system) according to a first embodiment. In FIG. 1, the reference signs TS1, TS2, and TSx (hereinafter, a representative sign is TS) denote some of a plurality of surveying instruments as managing targets, the reference sign MS denotes a management server, and the reference sign RC denotes a remote terminal. The surveying instruments TS1, TS2, and TSx, the management server MS, and the remote terminal RC are capable of communicating with each other via a communication network N such as the Internet. The communication network N may include arbitrary communication networks including local area networks such as in-company LANs, connection cables, and satellite communication networks, etc.

(Configuration of Surveying Instrument)

Figure 2:
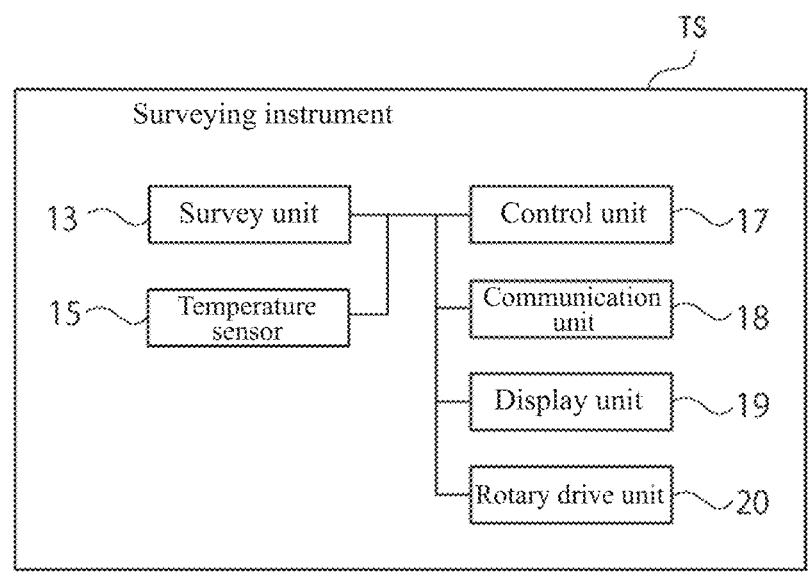
FIG. 2 is a configuration block diagram of a surveying instrument according to the first embodiment.

FIG. 2 is a configuration block diagram of a surveying instrument according to the first embodiment. The surveying instrument TS is a total station (electronic distance and angle measuring instrument). As shown in FIG. 2, the surveying instrument TS includes a survey unit 13, a temperature sensor 15, a control unit 17, a communication unit 18, a display unit 19, and a rotary drive unit 20.

The survey unit 13 includes a light emitting element, a distance-measuring optical system, and a light receiving element disposed inside a telescope (not shown) of the surveying instrument TS. The survey unit 13 emits distance-measuring light from the light emitting element via the distance-measuring optical system, receives reflected light from a target by the light receiving element, and measures a distance to the target. The survey unit 13 measures a vertical rotation angle of the telescope and a horizontal rotation angle of a housing (not shown) of the telescope by using a rotary encoder.

The temperature sensor 15 is attached inside the housing of the surveying instrument TS. It is also preferable that the temperature sensor 15 is attached inside a tilt sensor (not shown) for leveling disposed inside the housing so as to become close to an outside temperature. Alternatively, the temperature sensor 15 may be retrofitted (externally fitted) to the surveying instrument TS.

The communication unit 18 enables communication with the communication network N, and for example, makes a connection with the Internet by using an Internet protocol (TCP/IP).

The display unit 19 has a liquid crystal screen, and survey conditions, etc., can be input therein, and various information on a survey are displayed. The rotary drive unit 20 is a motor, and includes a device that rotates the telescope vertically and a device that rotates the housing horizontally.

The control unit 17 is a control unit including at least a CPU and a memory (ROM, RAM, etc.). The control unit 17 executes a survey application program and makes the display unit 19 display a screen according to the application. The control unit 17 acquires survey data of a measurement point by performing automatic leveling, distance measurement, and angle measurement of a target by driving the survey unit 13 and the rotary drive unit 20. In addition, the control unit 17 transmits and receives information to and from the management server MS via the communication network N by using the communication unit 18, and carries out a command from the management server MS. Further, the control unit 17 transmits temperature information acquired by the temperature sensor 15 to the management server MS. The temperature information is automatically transmitted when a power supply of the surveying instrument TS is turned ON or at a fixed cycle, for example, once an hour, or at least once a day. In the memory of the control unit 17, survey data and various programs for the above-described processes are stored.

(Configuration of Remote Terminal)

Figure 3:
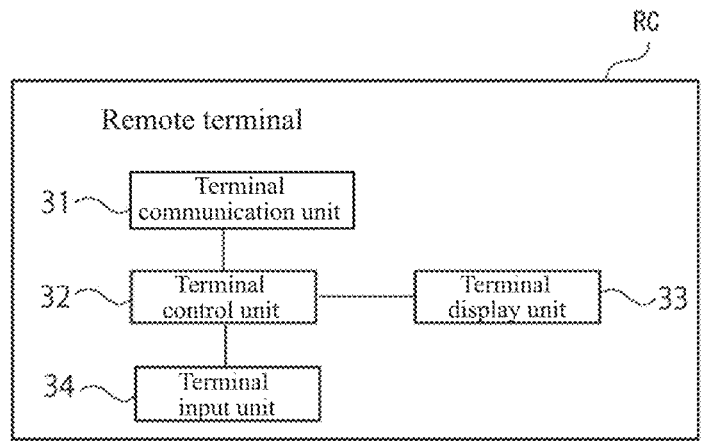
FIG. 3 is a configuration block diagram of a remote terminal according to the first embodiment.

FIG. 3 is a configuration block diagram of a remote terminal according to the first embodiment. The remote terminal RC is a terminal such as a personal computer, smartphone, tablet PC, or the like owned by a surveying instrument manufacturer or agent. The remote terminal RC includes, as shown in FIG. 3, at least a terminal communication unit 31, a terminal control unit 32, a terminal display unit 33, and a terminal input unit 34.

The terminal communication unit 31 can transmit and receive information to and from a server communication unit 41 described below of the management server MS via the communication network N.

The terminal input unit 34 is, for example, a keyboard or the like, and can input the following settings.

The terminal control unit 32 is a control unit including at least a CPU and a memory (ROM, RAM, etc.). The terminal control unit 32 sets a usable temperature of a surveying instrument (hereinafter, shown with a reference sign TSx) being a present setting target. In addition, the terminal control unit 32 sets a determination on the usable temperature and a temperature acquired by the temperature sensor 15 of the surveying instrument TSx. Further, the terminal control unit 32 sets an operation responsive to results of the determination. These are described in detail below.

Figure 4:
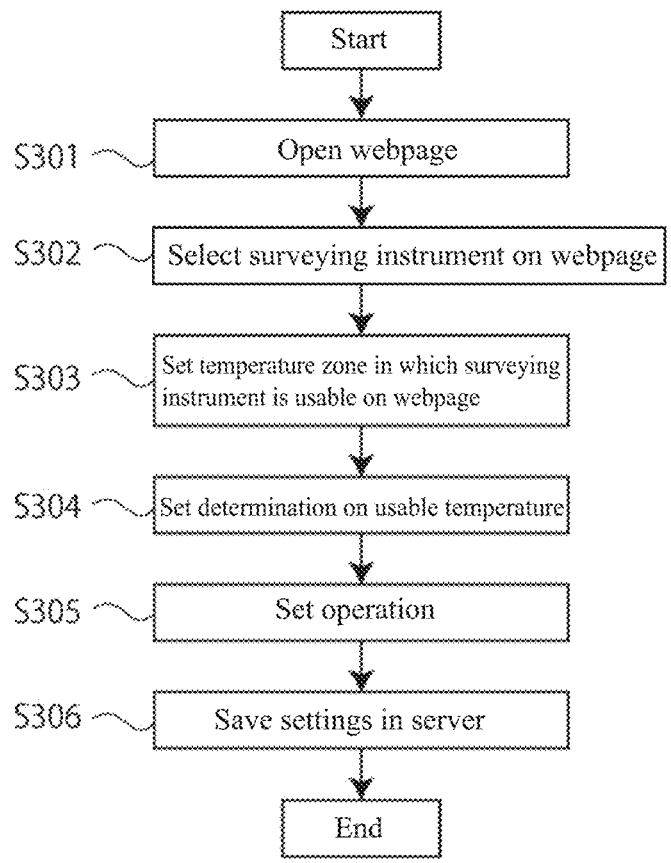
FIG. 4 is a flowchart at the time of setting of the communication management system according to the first embodiment.

FIG. 4 is a flowchart at the time of setting of the communication management system according to the first embodiment. First, in Step S301, an administrator of the surveying instrument TSx logs into an exclusive webpage 100 provided by a surveying instrument manufacturer from the remote terminal RC.

Next, when the process shifts to Step S302, a list of a plurality of registered surveying instruments is displayed on the terminal display unit 33, and the administrator selects a surveying instrument TSx being a present setting target.

Next, when the process shifts to Step S303, a screen to set a usable temperature of the surveying instrument TSx is displayed. On the webpage 100, an interface that enables designation of usable lower limit temperature and upper limit temperature is mounted. The administrator sets, on the webpage 100, a temperature zone in which the surveying instrument TSx is usable.

Figure 5:
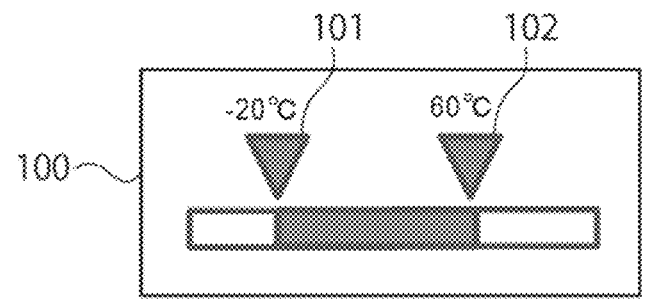
FIG. 5 shows an example of a webpage at the time of setting according to the first embodiment.

FIG. 5 shows an example of a webpage at the time of setting, and is an example of setting of a usable temperature of the surveying instrument TSx. The usable temperature of the surveying instrument TSx can be arbitrarily selected by respectively moving an arrow 101 showing a lower limit temperature and an arrow 102 showing an upper limit temperature in the horizontal direction.

Next, when the process shifts to Step S304, a setting field for a determination on the usable temperature set in Step S303 is displayed on the webpage 100. In the setting field for a determination, a plurality of options is displayed so as to be selected by, for example, a pull-down method or using check boxes. As options, for example, "When outside usable temperature," "When within usable temperature," "Moment of change from not lower than upper limit temperature to lower than upper limit temperature" or "Moment of change from not higher than lower limit temperature to higher than lower limit temperature," etc., are displayed. The configuration may be made so that the administrator can arbitrarily add options. The administrator sets a determination (determination criteria) according to his/her own management intentions.

Next, when the process shifts to Step S305, on the webpage 100, a setting field for an operation responsive to the determination set in Step S304 is displayed. In the setting field for an operation, a plurality of options is displayed so as to be selected by, for example, a pull-down method or using check boxes. As options, for example, "Send notification to registered e-mail address," "Notify on webpage," "Display warning on surveying instrument," and "Lock (stop the function of) surveying instrument," etc., are displayed. The configuration may be made so that the administrator can arbitrarily add options. The administrator sets an operation according to his/her own management intentions.

Next, the process shifts to Step S306, and the terminal control unit 32 transmits information on the usable temperature, determination, and operation set in Steps S303 to 305 described above to the management server MS via the terminal communication unit 31. The terminal control unit 32 ends the setting program upon receiving a normal reception response from the management server MS.

(Configuration of Management Server)

Figure 6:
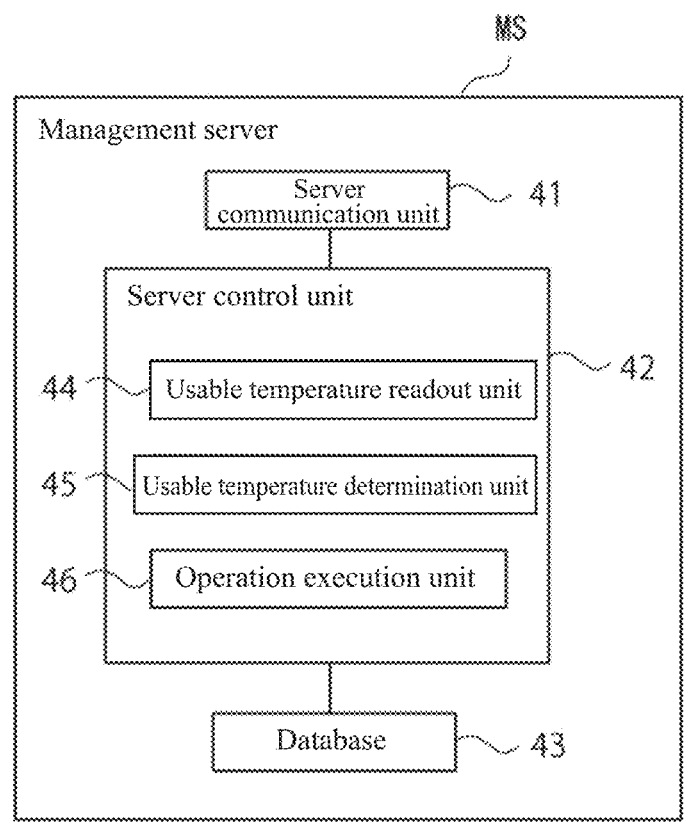
FIG. 6 is a configuration block diagram of a management server according to the first embodiment.

FIG. 6 is a configuration block diagram of the management server according to the first embodiment. The management server MS includes, as shown in FIG. 6, at least a server communication unit 41, a server control unit 42, and a database 43.

The server communication unit 41 can transmit and receive information to and from the communication unit 18 of the surveying instrument TS and the terminal communication unit 31 via the communication network N.

In the database 43, information received from the surveying instrument TS and the remote terminal RC are saved in association with a management number of the surveying instrument TS.

The server control unit 42 is a control unit including at least a CPU and a memory (ROM, RAM, etc.). The server control unit 42 includes, as shown in FIG. 6, a usable temperature readout unit 44, a usable temperature determination unit 45, and an operation execution unit 46.

The usable temperature readout unit 44 reads out a usable temperature (a lower limit temperature and an upper limit temperature) of the surveying instrument TSx transmitted from the management server MS and saved in the database 43. The usable temperature determination unit 45 compares the usable temperature of the surveying instrument TSx and a temperature of the surveying instrument TSx, and based on the determination transmitted from the management server MS and saved in the database 43, determines whether or not the temperature of the surveying instrument TSx is within the usable temperature. The operation execution unit 46 reads out the operation transmitted from the management server MS and saved in the database 43, and based on results of the determination of the usable temperature determination unit 45, executes the set operation. Hereinafter, these are described in detail.

Figure 7:
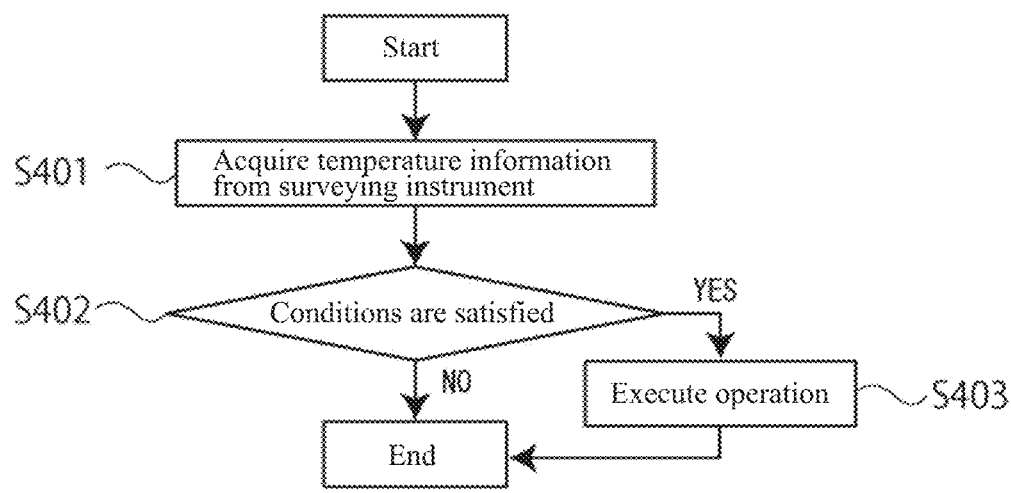
FIG. 7 is a process flowchart of the management server according to the first embodiment.

FIG. 7 is a process flowchart of the management server according to the first embodiment. First, in Step S401, the management server MS receives a current temperature from the surveying instrument TSx. When receiving the temperature information, the management server MS shifts the process to Step S402.

Next, when the process shifts to Step S402, the usable temperature readout unit 44 reads out the usable temperature of the surveying instrument TSx from the database 43, and the usable temperature determination unit 45 compares the usable temperature and the temperature of the surveying instrument TSx. When determination conditions are not satisfied, the management server MS ends the process. On the other hand, when the determination conditions are satisfied, the process shifts to Step S403, and the operation execution unit 46 executes the set operation. Thereafter, the management server MS ends the process.

A usage example of the communication management system according to the first embodiment is shown.

(1) A user opens the webpage 100 on the remote terminal RC, sets the usable temperature to "−20° C. to 60° C.," the determination to "When used outside the usable temperature," the operation to "Display warning and lock function of surveying instrument TSx, and sends notification e-mail to owner of surveying instrument TSx" and saves these, and closes the webpage 100.

(2) The surveying instrument TSx transmits a current temperature to the management server MS after the power supply is turned ON. When receiving the temperature information, the management server MS compares the temperature of the surveying instrument TSx and the usable temperature designated in (1). When the surveying instrument is used within the usable temperature, the management server MS transmits a normal response to the surveying instrument TSx, and a user can normally use the surveying instrument TSx.

Figure 8:
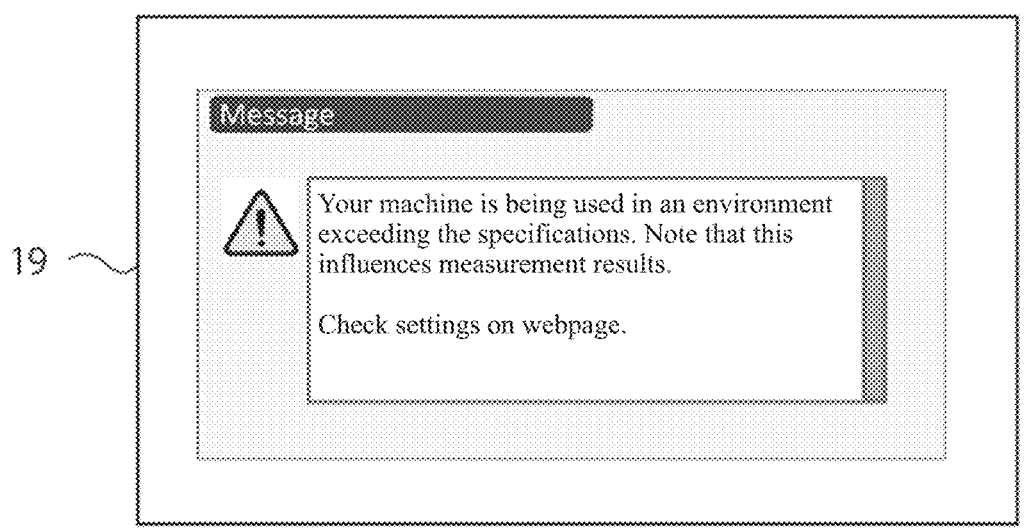
FIG. 8 shows an example of a warning to be displayed on the surveying instrument according to the first embodiment.

(3) On the other hand, when use outside the usable temperature is detected, based on the operation set in (1), the management server MS commands the surveying instrument TSx to display a warning and lock its function, and notifies the owner that the surveying instrument TSx is being used outside the usable temperature by e-mail. The surveying instrument TSx that has received the command from the management server MS displays a warning on the display unit 19, and subsequently, stops operation except for turning-off of the power supply. FIG. 8 shows an example of a warning to be displayed on the surveying instrument according to the first embodiment, and a warning such as "Your machine is being used in an environment exceeding the specifications. Note that this influences measurement results. Check settings on webpage." is displayed. The warning may be a sound output when the surveying instrument TSx is provided with a speaker.

In the system according to the first embodiment, a usable temperature of the surveying instrument TSx, a determination on the usable temperature and a temperature of the surveying instrument, and an operation responsive to results of the determination are set in advance, and the management server MS monitors whether or not the surveying instrument TSx is used within the usable temperature. When the surveying instrument TSx is used outside the usable temperature, the management server MS responds immediately. Therefore, when the surveying instrument TS is used outside the usable temperature, an operator and/or owner can notice that the surveying instrument TS is being used in an environment in which measurement accuracy cannot be kept.

When the surveying instrument TS is used outside the usable temperature, the management server MS automatically issues a warning or locks the function, so that a survey for which measurement accuracy is not guaranteed can be suppressed.

Second Embodiment

In a second embodiment, the same elements as in the first embodiment are designated by the same reference signs, and description thereof is omitted. In the first embodiment, a temperature of the surveying instrument TS is directly monitored by the temperature sensor 15, however, in the second embodiment, a temperature of the surveying instrument TS is monitored by being predicted.

(Entire Configuration of System)

An entire configuration of a communication management system (hereinafter, simply referred to as system) in the second embodiment is the same as in FIG. 1, and includes surveying instruments TS1, TS2, and TSx, a management server MS, and a remote terminal RC.

(Configuration of Surveying Instrument)

Figure 9:
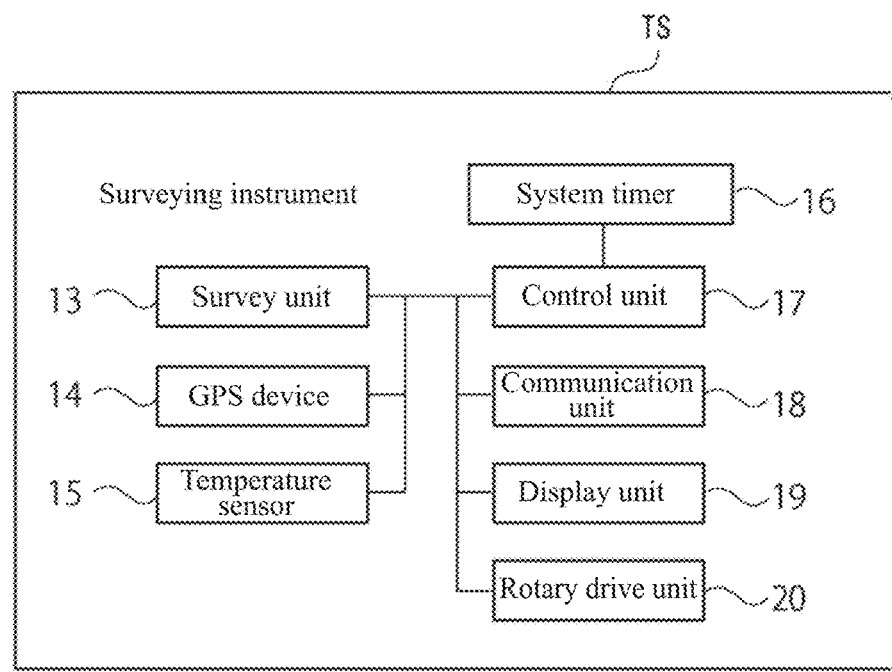
FIG. 9 is a configuration block diagram of a surveying instrument according to a second embodiment of the present invention.

FIG. 9 is a configuration block diagram of a surveying instrument according to the second embodiment. As shown in FIG. 9, the surveying instrument TS according to the second embodiment includes a survey unit 13, a GPS device 14, a temperature sensor 15, a system timer 16, a control unit 17, a communication unit 18, a display unit 19, and a rotary drive unit 20. The GPS device 14, the temperature sensor 15, and the communication unit 18 may be retrofitted (externally fitted) to the surveying instrument TS.

The survey unit 13, the temperature sensor 15, the communication unit 18, the display unit 19, and the rotary drive unit 20 are the same as in the first embodiment.

The GPS device 14 receives a signal from a GPS satellite to acquire GPS information (time, latitude, longitude, and altitude) of the surveying instrument TS.

The system timer 16 uses an operation clock of a CPU of the control unit 17 described below as an oscillator, and includes a hardware timer that counts clock pulses of the clock, and a software timer that generates interruption processing synchronously with the hardware timer and counts carries. The system timer 16 acquires a current time (system time) of the surveying instrument TS by operating count values of the hardware timer and the software timer. The system timer 16 may correct the system time as necessary by acquiring a UTC time from the GPS information of the GPS device 14.

The control unit 17 executes a survey application program and displays it, and performs automatic leveling, distance measurement, and angle measurement of a target to acquire survey data at a measurement point. The control unit 17 transmits and receives information to and from the management server MS via a communication network N by using the communication unit 18, and carries out a command from the management server MS. Further, the control unit 17 transmits, to the management server MS, temperature information acquired by the temperature sensor 15, GPS information acquired by the GPS device 14, and time information acquired by the system timer 16. The temperature information, the GPS information, and the time information described above are, for example, automatically transmitted when the power supply of the surveying instrument TS is turned ON or at a fixed cycle such as once an hour or at least once a day. In the memory of the control unit 17, survey data and various programs for the above-described processes are stored.

(Configuration of Remote Terminal)

The configuration of the remote terminal RC in the second embodiment is the same as in FIG. 3, and the remote terminal RC is a terminal such as a personal computer, a smartphone, or a tablet PC including at least a terminal communication unit 31, a terminal control unit 32, a terminal display unit 33, and a terminal input unit 34.

The terminal control unit 32 in the second embodiment sets usable conditions of a surveying instrument TSx being a present setting target. Usable conditions are set according to elements relating to a usable temperature of the surveying instrument TSx and a position and time of the surveying instrument TSx. The terminal control unit 32 sets a determination on the set usable conditions. In addition, the terminal control unit 32 sets an operation responsive to results of the determination. Hereinafter, these are described in detail.

Figure 10:
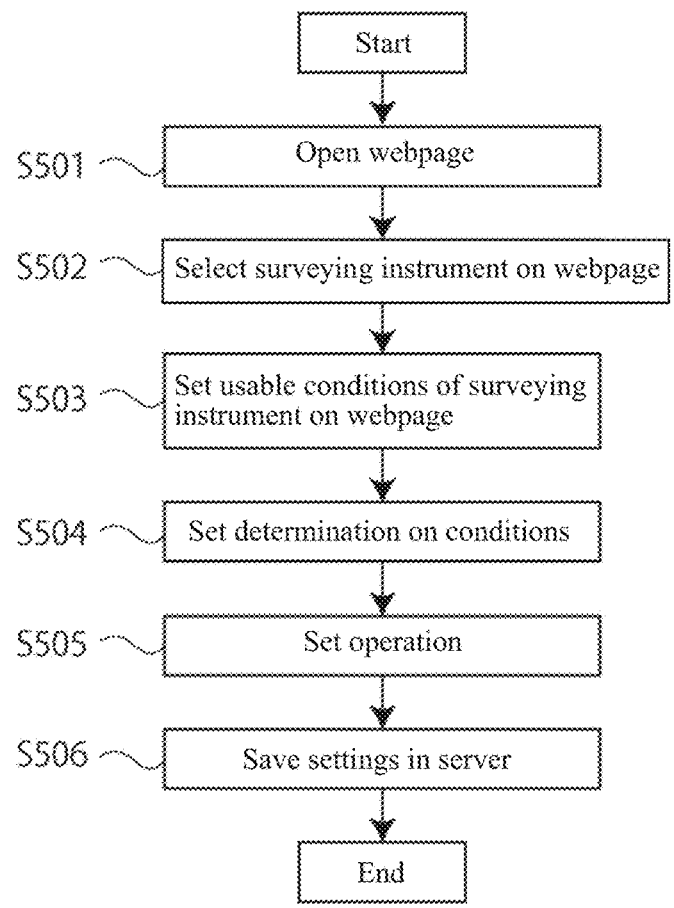
FIG. 10 is a flowchart at the time of setting of a communication management system according to the second embodiment.

FIG. 10 is a flowchart at the time of setting of the communication management system according to the second embodiment. First, in Step S501, an administrator of the surveying instrument TSx logs into an exclusive webpage 100 provided by a surveying instrument manufacturer from the remote terminal RC.

Next, when the process shifts to Step S502, a list of a plurality of registered surveying instruments is displayed on the terminal display unit 33, and the administrator selects a surveying instrument TSx as a present setting target.

Next, when the process shifts to Step S503, a screen to set usable conditions of the surveying instrument TSx is displayed. Usable conditions to be set are "usable temperature," "applicable range," and "applicable period."

Setting of the "usable temperature" is the same as in the first embodiment, and a lower limit temperature and an upper limit temperature can be arbitrarily selected (refer to FIG. 5 by way of example).

As setting of "applicable range," position information of a range in which the determination is applied to the surveying instrument TSx is designated. As setting of an applicable range of the surveying instrument TSx, for example, by using a layer superimposed on a map displayed on the webpage 100, an arbitrary range can be set with a rectangle drawn by mouse clicking or a figure drawn freehand on the map, etc. Besides this, an applicable range may be set by inputting a radius, a latitude and a longitude from a center of a site, or an address or country name, etc., into a text box displayed on the webpage 100. Position information of the applicable range set on the webpage 100 is grasped by being converted into a latitude and a longitude.

As setting of an "applicable period," a period in which the determination is applied to the surveying instrument TSx is designated. As setting of an applicable time of the surveying instrument TSx, "year/month/day" and "hour/minute" can be freely combined or selected.

Next, when the process shifts to Step S504, a setting field for a determination on the usable conditions set in Step S503 is displayed on the webpage 100. In the setting field for a determination, a plurality of options is displayed so as to be selected by, for example, a pull-down method or using check boxes. As options, for example, "When outside usable temperature," "When within usable temperature," "When predicted to become outside usable temperature," and "When predicted to be within usable temperature," etc., are displayed. The configuration may be made so that the administrator can arbitrarily add options. The administrator sets a determination (determination criteria) according to his/her own management intentions.

Next, when the process shifts to Step S505, a setting field for an operation responsive to the determination set in Step S504 is displayed on the webpage 100. In the setting field for an operation, a plurality of options is displayed so as to be selected by, for example, a pull-down method or using check boxes. As options, for example, "Send notification to registered e-mail address," "Notify on webpage," "Display warning on surveying instrument," and "Lock surveying instrument (stop function)," etc., are displayed. The configuration may be made so that the administrator can arbitrarily add options. The administrator sets the operation according to his/her own management intentions.

Next, the process shifts to Step S506, and the terminal control unit 32 transmits information on the usable conditions, the determination, and the operation set in Steps S503 to S505 described above to the management server MS via the terminal communication unit 31. The terminal control unit 32 ends the setting program upon receiving a normal reception response from the management server MS.

(Configuration of Management Server)

Figure 11:
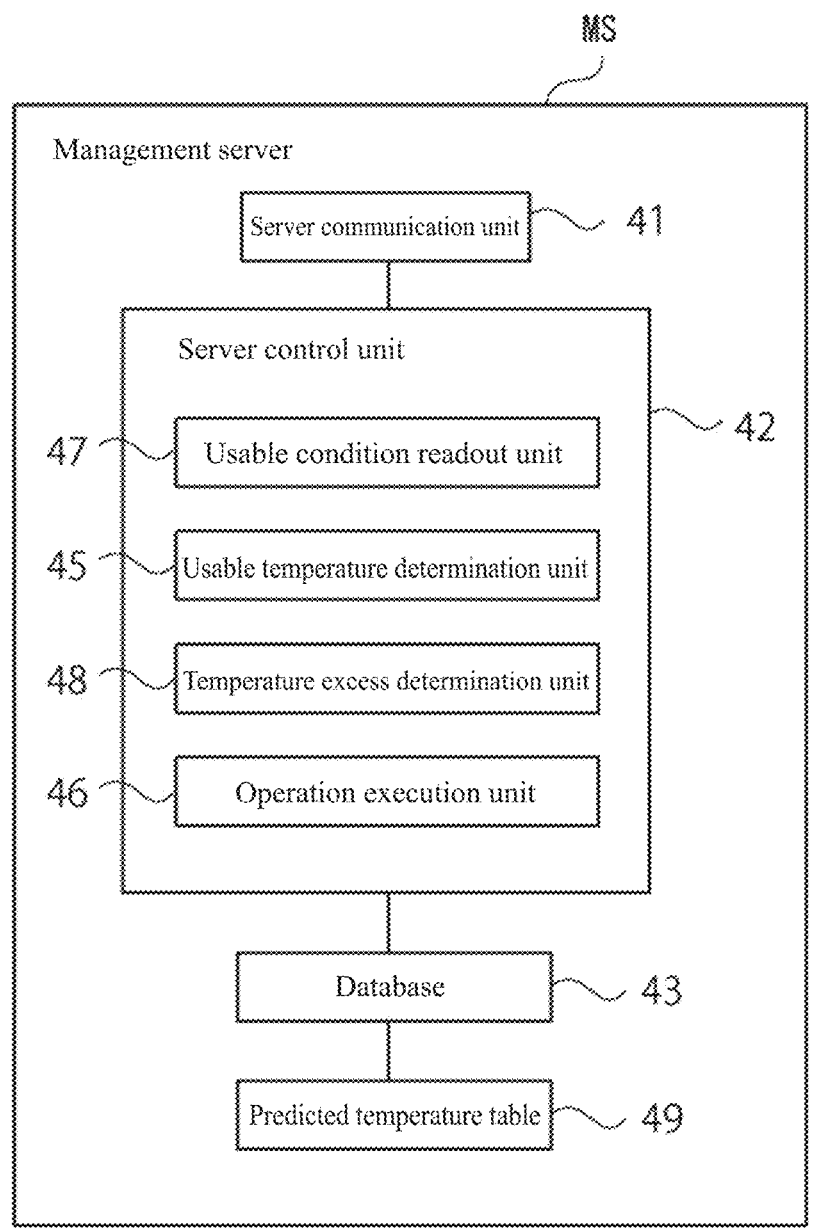
FIG. 11 is a configuration block diagram of a management server according to the second embodiment.

FIG. 11 is a configuration block diagram of the management server according to the second embodiment. The management server MS according to the second embodiment also includes, as shown in FIG. 11, at least a server communication unit 41, a server control unit 42, and a database 43.

The server control unit 42 according to the second embodiment is a control unit including at least a CPU and a memory (ROM, RAM, etc.), and includes a usable condition readout unit 47, a usable temperature determination unit 45, a temperature excess determination unit 48, and an operation execution unit 46.

The usable condition readout unit 47 reads out a usable temperature, an applicable range (latitude and longitude), and an applicable time (year/month/day and time) of the surveying instrument TSx transmitted from the management server MS and saved in the database 43.

The usable temperature determination unit 45 determines whether a temperature of the surveying instrument TSx is within or outside the usable temperature by comparing the usable temperature (a lower limit temperature and an upper limit temperature) of the surveying instrument TSx and a temperature of the surveying instrument TSx in a similar manner as in the first embodiment.

The temperature excess determination unit 48 determines whether a position of the surveying instrument TSx is within or outside the applicable range by comparing the coordinates (latitude and longitude) of the applicable range of the surveying instrument TSx and GPS coordinates (latitude and longitude) of the surveying instrument TSx. In addition, by comparing the applicable time of the surveying instrument TSx and a current time of the surveying instrument TSx, the temperature excess determination unit 48 determines whether a time of use of the surveying instrument TSx is within or outside the applicable time. Then, when the position of the surveying instrument TSx is within the applicable range, and the time of use of the surveying instrument TSx is within the applicable time, the temperature excess determination unit 48 determines whether or not a usage environment of the surveying instrument TSx will become outside the usable temperature in the future.

In the database 43, information received from the surveying instrument TS and the remote terminal RC are saved in association with a management number of the surveying instrument TS. Further, in the database 43 of the present embodiment, a predicted temperature table 49 of recorded air temperatures in the corresponding region, statistically predicted based on the position (latitude and longitude) information and the time (year/month/day and hour/minute) information is stored. The predicted temperature table 49 is prepared and saved in advance in the database 43, and is configured so that the data is updatable.

The operation execution unit 46 executes the operation set from the management server MS based on results of the determinations made by the determination units 45 and 48. Hereinafter, this is described in detail.

Figure 12:
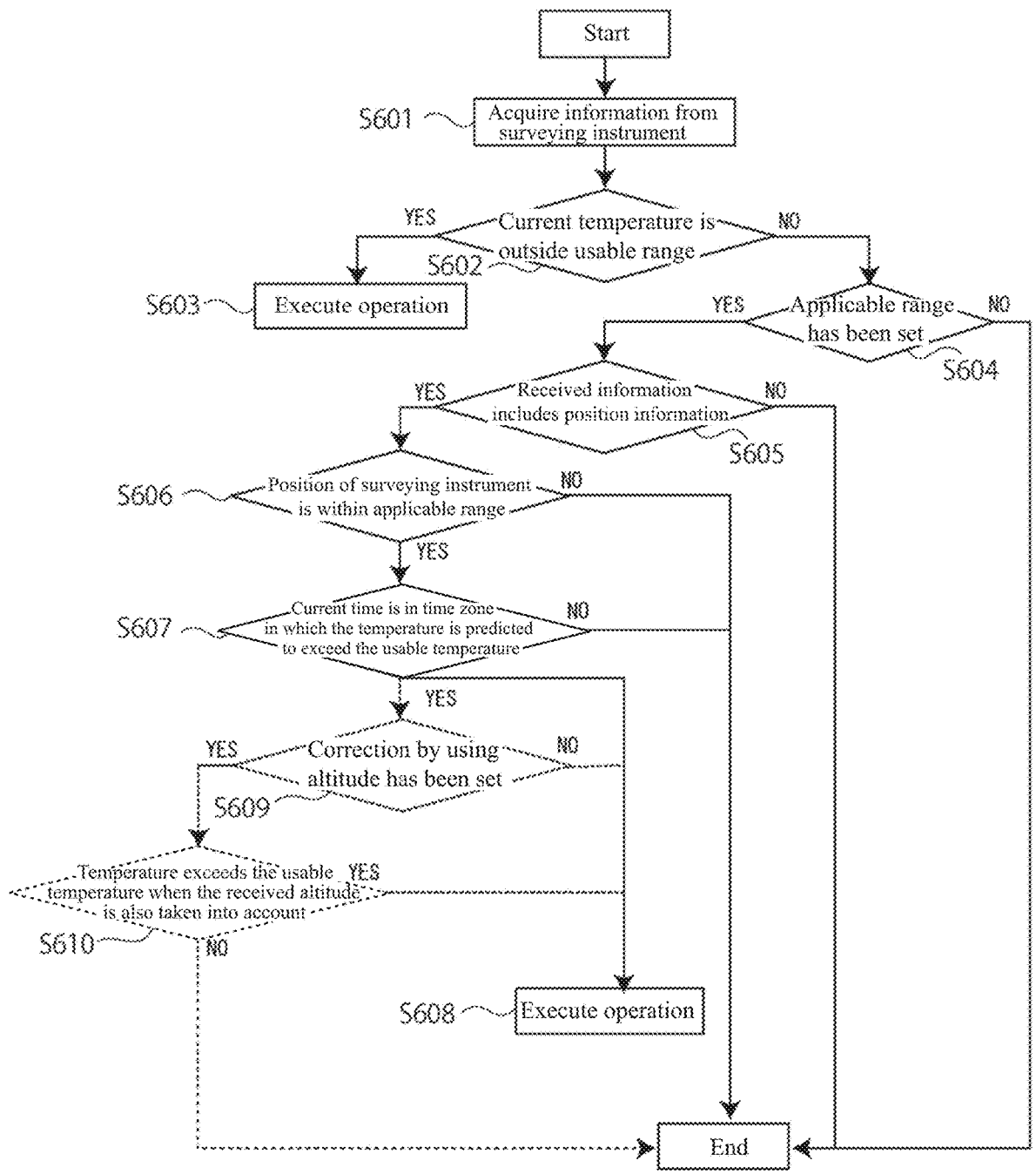
FIG. 12 is a process flowchart of the management server according to the second embodiment.

FIG. 12 is a process flowchart of the management server according to the second embodiment. First, in Step S601, the management server MS receives temperature information, GPS information, and time information from the surveying instrument TSx, and the usable condition readout unit 47 reads out usable conditions (a usable temperature, an applicable range, and an applicable time) of the surveying instrument TSx from the database 43.

Next, the process shifts to Step S602, and the usable temperature determination unit 45 compares the usable temperature and a current temperature of the surveying instrument TSx. When the temperature of the surveying instrument TSx is higher than the usable temperature (Yes), the process shifts to Step S603, and an operation set for "When outside usable temperature" is executed. When the current temperature of the surveying instrument TSx is not higher than the usable temperature (No), the process shifts to Step S604.

When the process shifts to Step S604, the temperature excess determination unit 48 checks if an applicable range has been set in the usable conditions. When an applicable range is not set (No), a temperature excess cannot be predicted, so that the management server MS ends the process. When an applicable range is set (Yes), the process shifts to Step S605.

When the process shifts to Step S605, the temperature excess determination unit 48 checks if position information of the surveying instrument TSx is included in the information received in Step S601. When no position information is included (No), a temperature excess cannot be predicted, so that the management server MS ends the process. When position information is included (Yes), the process shifts to Step S606.

When the process shifts to Step S606, the temperature excess determination unit 48 determines whether the position of the surveying instrument TSx is within or outside the applicable range. When it is outside the applicable range (No), the surveying instrument TSx is not a present target to be managed, so that the management server MS ends the process. When the position is within the applicable range (Yes), the process shifts to Step S607.

When the process shifts to Step S607, the temperature excess determination unit 48 determines whether or not a predicted temperature of the surveying instrument TSx will become outside the usable temperature in the future by comparing a position of the surveying instrument TSx and a current time of the surveying instrument TSx with a predicted temperature table 49 of the database 43. When a time zone in which the temperature is predicted to become outside the usable temperature will not be reached (No), the management server MS ends the process. When the time zone in which the temperature is predicted to become outside the usable temperature will be reached (Yes), the process shifts to Step S608, an operation set for "When predicted to become outside usable temperature" is executed, and the management server MS ends the process. Steps S609 and S610 shown by the dashed lines in FIG. 12 are described below.

A usage example of the communication management system according to the second embodiment is described.

(1) An administrator opens a webpage 100 on the remote terminal RC, and sets, as usable conditions, "Usable temperature: −20° C. to 60° C.," "Applicable range: Saudi Arabia," and "Applicable time: 10:00 to 16:00 on July 1 to October 31," as the determination, "When the temperature is outside the usable temperature and when the temperature is predicted to become outside the usable temperature," and as the operation, "Display warning on the surveying instrument TSx and lock the function, and sends notification e-mail to owner of the surveying instrument TSx" and saves these, and then closes the webpage 100.

(2) The surveying instrument TSx transmits temperature information, GPS information, and time information to the management server MS once an hour. When receiving the information, the management server MS compares the usable temperature and the temperature of the surveying instrument TSx, and determines whether or not the temperature of the surveying instrument TSx is within the usable temperature. When the temperature is within the usable temperature, by comparing the current position and the current time of the surveying instrument TSx with the predicted temperature table 49, the management server MS determines whether or not a predicted temperature of the surveying instrument TSx will reach a predicted time zone in which the predicted temperature will become outside the usable temperature in the future.

(3) When the current temperature of the surveying instrument TSx is within the usable temperature, or when a predicted temperature of the surveying instrument TSx is predicted to fall within the usable temperature, the management server MS transmits a normal response to the surveying instrument TSx, and the user can normally use the surveying instrument TSx. When the current temperature of the surveying instrument TSx is outside the usable temperature, or when a predicted temperature of the surveying instrument TSx is predicted to become outside the usable temperature in the future, based on the operation set in (1), the management server MS commands the surveying instrument TSx to display a warning and lock the function, and notifies the owner that the surveying instrument TSx is being used outside the range by e-mail. The surveying instrument TSx that received the command from the management server MS displays a warning (refer to FIG. 8 by way of example) on the display unit 19, and subsequently, stops operation except for turning-OFF of the power supply.

In the system according to the second embodiment, by setting usable conditions (an applicable range and an applicable time) of the surveying instrument TSx, a determination on the usable conditions, and an operation responsive to results of the determination in advance, the management server MS predicts whether or not the surveying instrument TSx will be used in an environment exceeding the usable temperature in the future, and monitors it. Then, in a case where the surveying instrument TSx will enter an environment exceeding the usable temperature in the future, the management server MS responds immediately. Therefore, when there is a possibility that the surveying instrument TS may be used outside the usable temperature, the operator and/or owner can notice that the surveying instrument may be used in an environment in which measurement accuracy is not guaranteed. When there is a possibility that the surveying instrument TS may be used outside the usable temperature, the management server MS automatically issues a warning and locks the function, so that a survey in which measurement accuracy cannot be kept can be suppressed.

The system according to the second embodiment is intended to prevent the surveying instrument TSx from being used in an environment exceeding the guaranteed range of specifications by predicting whether or not the surveying instrument TSx will enter an environment exceeding the usable temperature in the future (temperature excess prediction). The temperature excess prediction is performed by using the GPS information and time information of the surveying instrument TSx, and the predicted temperature table 49 stored in the management server MS.

The above-described example (FIG. 9 to FIG. 12) of the system of the present embodiment is an example in which a system that directly monitors the temperature of the surveying instrument TS according to the first embodiment and the above-described temperature excess prediction system are combined. Therefore, in an embodiment relating to only the temperature excess prediction, the temperature sensor 15 shown in FIG. 9 is an arbitrary component. Transmission of temperature information from the surveying instrument TSx to the management server MS is also arbitrary. The display of "When outside usable temperature" and "When within usable temperature" illustrated in Step S504 in FIG. 10 is also arbitrary. The usable temperature determination unit 45 in FIG. 11 is also an arbitrary component. Comparison of the current temperature in Steps S602 and S603 in the process flow in FIG. 12 is also arbitrary.

(Modification)

A modification of the system of the second embodiment is described. It is also preferable that, as usable conditions of the surveying instrument TSx, an element relating to the altitude of the surveying instrument TSx is added. The "Applicable altitude" is displayed as an arbitrary element on the webpage 100. As setting of "Applicable altitude," for example, "Geoid height: 36.0 m to 350.0 m" is input.

A process flow of the management server MS in a case where the "Applicable altitude" has been set is described with reference to FIG. 12. For example, the process for "Applicable altitude" is shown by dashed lines, and is performed after the process of Step S607. In Step S607, when the surveying instrument TSx is determined to reach a predicted time zone in which it will become outside the usable temperature in the future (Yes), the process shifts to Step S609 to perform the process for "Applicable altitude."

When the process shifts to Step S609, the temperature excess determination unit 48 checks whether an applicable altitude has been set in usable conditions. In a case where it has not been set (No), a temperature excess cannot be predicted, so that the management server MS ends the process. In a case where an applicable altitude has been set (Yes), the process shifts to Step S610.

When the process shifts to Step S610, the temperature excess determination unit 48 applies altitude correction to a predicted temperature readout from the predicted temperature table 49 in the database 43 based on altitude information (included in the GPS information) received from the surveying instrument TSx. Then, based on the predicted temperature to which altitude correction was applied (hereinafter, referred to as corrected temperature), the temperature excess determination unit 48 determines whether or not the corrected temperature of the surveying instrument TSx will reach a predicted time zone in which the corrected temperature will become outside the usable temperature in the future. When the temperature is not predicted to become outside the usable temperature (No), the management server MS ends the process. When the temperature is predicted to become outside the usable temperature (Yes), the process shifts to Step S608, the operation set for "When the temperature is predicted to become outside the usable temperature" is executed, and then the management server MS ends the process.

According to this modification, temperature excess prediction in which the altitude is additionally taken into account can be performed, and this is preferable when the surveying instrument TSx is used in a high-altitude area. When the surveying instrument TSx includes an atmospheric pressure sensor, a value of the atmospheric pressure sensor may be used as altitude information of the surveying instrument TSx.

Although preferred embodiments and a modification of the present invention are described above, these can be altered and combined based on knowledge of a person skilled in the art, and such an altered or combined embodiment is also included in the scope of the present invention.

REFERENCE SIGNS LIST

TS1, TS2, TSx Surveying instrument
RC Remote terminal
MS Management server
13 Survey unit
14 GPS device
15 Temperature sensor
16 System timer
17 Control unit
18 Communication unit
19 Display unit
20 Rotary drive unit
31 Terminal communication unit
32 Terminal control unit
33 Terminal display unit
41 Server communication unit
42 Server control unit
43 Database
44 Usable temperature readout unit
45 Usable temperature determination unit
46 Operation execution unit
47 Usable condition readout unit
48 Temperature excess determination unit
49 Predicted temperature table
100 Webpage

The invention claimed is:

1. A communication management system comprising:
a surveying instrument including a survey unit that surveys a target located a distance from the survey unit, a temperature sensor that senses temperature at the survey unit, a control unit that controls the survey unit, and a communication unit that enables communication between the control unit and a communication network;
a management server capable of communicating with the surveying instrument via the communication network; and
a remote terminal capable of communicating with the management server,
wherein the remote terminal includes a screen that displays a temperature setting interface that allows a system administrator to select a usable temperature range for the surveying instrument consistent with a guaranteed range of specifications of the surveying instrument, and wherein the remote terminal further sets a determination on the usable temperature range and a temperature acquired by the temperature sensor, and an operation responsive to results of the determination, and causes the management server to store the usable temperature range, the determination, and the operation,
wherein the surveying instrument transmits its own temperature information to the management server, and
wherein the management server makes the determination by comparing the usable temperature and a temperature acquired by the temperature sensor, and executes the operation to prevent the surveying instrument from being used in the environment exceeding the guaranteed range of the specifications based on results of the determination.

2. The communication management system according to claim 1, wherein when a temperature of the surveying instrument is outside the usable temperature in the determination, as the operation, the management server notifies an owner and/or an administrator of the surveying instrument, and/or issues a warning to the surveying instrument and/or stops the function of the surveying instrument.

3. A communication management system comprising:
a surveying instrument including a survey unit that surveys a target located a distance from the survey unit, a GPS device that measures coordinates of the survey unit, a system timer that acquires a current time, a control unit that controls the survey unit, the GPS device, and the system timer, and a communication unit that enables communication between the control unit and a communication network;
a management server capable of communicating with the surveying instrument via the communication network; and
a remote terminal capable of communicating with the management server, wherein the remote terminal includes a screen that displays a temperature setting interface that allows a system administrator to select a usable temperature range to prevent the surveying instrument from being used in an environment exceeding a guaranteed range of specifications, wherein the remote terminal further sets a position and time of the surveying instrument, sets a determination on a predicted temperature predicted from GPS information acquired by the GPS device and time information acquired by the system timer, and the usable conditions, and an operation responsive to results of the determination, and causes the management server to store the usable conditions, the determination, and the operation, wherein the surveying instrument transmits its own GPS information and time information to the management server, and wherein the management server makes the determination by comparing the usable temperature and a predicted temperature predicted from the GPS information and the time information, and executes the operation to prevent the surveying instrument from being used in the environment exceeding the guaranteed range of the specifications based on results of the determination.

4. The communication management system according to claim 3, wherein when a predicted temperature of the surveying instrument is outside the usable temperature in the determination, as the operation, the management server notifies an owner and/or an administrator of the surveying instrument, and/or issues a warning to the surveying instrument and/or stops the function of the surveying instrument.

5. The communication management system according to claim 3, wherein the surveying instrument also transmits its own altitude information as the GPS information to the management server, a condition on the altitude is added to the usable conditions, and the management server corrects the predicted temperature based on the altitude information, makes the determination by comparing a corrected temperature and the usable temperature, and executes the operation based on results of the determination.

* * * * *